United States Patent [19]

Tepmongkol

[11] Patent Number: 5,757,982
[45] Date of Patent: May 26, 1998

[54] QUADRANTAL SCALING OF DOT MATRIX DATA

[75] Inventor: Warangkana Tepmongkol, Boise, Id.

[73] Assignee: Hewlett-Packard Company, Palo Alto, Calif.

[21] Appl. No.: 324,997

[22] Filed: Oct. 18, 1994

[51] Int. Cl.$^6$ ............... G06K 9/40; G06K 9/32
[52] U.S. Cl. ............ 382/298; 358/296; 358/298; 358/460; 382/254; 382/266; 382/267; 382/298; 382/301
[58] Field of Search ............ 382/298, 266, 382/254, 267, 301; 358/298, 296, 460

[56] References Cited

U.S. PATENT DOCUMENTS

| | | | |
|---|---|---|---|
| 3,573,789 | 4/1971 | Sharp | 382/254 |
| 4,342,051 | 7/1982 | Suzuki et al. | 358/460 |
| 4,437,122 | 3/1984 | Walsh et al. | 382/267 |
| 5,170,442 | 12/1992 | Murai et al. | 382/301 |
| 5,329,599 | 7/1994 | Curry et al. | 382/54 |

FOREIGN PATENT DOCUMENTS 0610928 8/1994 European Pat. Off. ......... G06T 3/40

*Primary Examiner*—Leo H. Boudreau
*Assistant Examiner*—Daniel G. Mariam

[57] ABSTRACT

In its basic aspects, the present invention uses a 3×3 data window to examine and to convert data in a 2×-resolution enhancement. Data is altered from a linear 2×-expansion method if and when the 3×3 data meets four criteria that determines the frequency content of the original 3×3 data window subset. The criteria are deterministic of whether a random pattern—such as in a graphical artwork figure—or a logical frequency domain pattern—namely text characters, numbers, or the like—are being printed. The method is particularly useful in dot matrix, or bit mapped, printing and the like. The data smoothing method is employed only after it is determined that a logical frequency domain pattern is being analyzed.

9 Claims, 3 Drawing Sheets

WHERE: 1 = BLACK
0 = WHITE
X = DON'T CARE

QUADRANTAL SCALING OF DOT MATRIX DATA

FIELD OF THE INVENTION

The present invention relates generally to dot matrix technology and more particularly to a method of enhancing a black and white dot matrix when scaling data to a higher density.

BACKGROUND OF THE INVENTION

Character generation in dot matrix technology generally takes the form of raster graphics—a computer graphics coding technique which codes each picture element, or pixel, of the picture area in digital form. That is, a dot matrix character pattern is a composite of a plurality of dots, each of which is assigned a binary value of either a "0" or a "1", indicating that the particular dot is either left blank or filled in.

Character generation in dot matrix printing technology takes the form of bitmap graphics. Each dot is assigned a binary pixel value indicating either to leave the dot blank or to mark it with ink, toner, photo-sensitive exposure, thermo-sensitive heating, or the like.

As dot matrix printing technology improves, the print density increases. For example, recent ink-jet technology has provided commercial products with the capability to print at a density of 600 dots per inch ("DPI"). Technological development has also introduced superior performance 1200 DPI hard copy devices, providing superior print quality. Moreover, improved machines allow the user to select between different print density, for example, a lower print density for high speed printing or a higher print density for high quality printing.

When using higher print density for improvement in print quality, the print data often needs to be converted from its original form to the higher density format. For example, a character pattern developed for a 300 DPI printer requires a two-to-one conversion to print at 600 DPI.

One solution is a straight linear scaling conversion of the data in a two-to-one ratio (hereinafter referred to as a "2×-expansion"). With this method, each pixel is replaced with four like-valued dots, two dots horizontally and two dots vertically. However, the expanded data often has in undesirable effects, such as accentuating jagged features of an image or an alphanumeric text character, rather than smoothing such edge features to improve the appearance of the print.

One dot matrix printing technology offers smoothing of the undesirable jagged features by altering the size and shape of the dots. For example, in ink-jet printing, the size or shape of the ink droplet fired by the printhead onto the paper can be modulated. In laser printing, (for example, U.S. Pat. No. 4,460,909 (Bassetti)) modulation of the laser beam intensity impinging on a photoconductive drum can move edges in sub-dot increments. These technologies require some means of print density improvement, or conversion, as with high resolution devices.

U.S. Pat. No. 3,573,789 (Sharp) describes a method of increasing the resolution of a bitmap image. This algorithm interrogates each data bit (pixel) with respect to two or more surrounding data bits to determine a more effective expansion of the data bit. A storage device contains the pixel under scrutiny and its surrounding eight pixels; the three adjacent pixels from the bitmap row above the pixel under scrutiny, the three adjacent pixels from the row below, and the left and right adjacent pixels. This three-by-three window of pixels is input to an expansion logic circuit. If the expansion logic senses a pixel combination in the window that is undesirable, such as a jagged feature, it modifies the shape of the expansion pixels to smooth the feature. If no edge feature is sensed, a 2×-expansion is applied.

U.S. Pat. No. 4,437,122 (Walsh) performs a similar expansion and smoothing. Using the pixel under scrutiny and its surrounding pixels, the pixel is expanded into a plurality of new pixels in accordance with one of several stored patterns in a read-only memory (ROM). The three-by-three window of pixels forms a nine bit identifier and is used as an address input to a decoding ROM. The ROM output then selects the particular combination of new pixels used for the expansion.

Sharp and Walsh methods are effective at scaling and smoothing objects such as text characters. However, bitmap images are often a composite of both text characters and graphical artwork or half-tone pictures. A given window pixel pattern with an undesirable feature on text is generally an exact representation on graphical artwork or half-tone pictures. The smoothing applied to the pixel under scrutiny then will alter this exact representation and distort graphical artwork or half-tone pictures.

U.S. Pat. No. 4,847,641 (Tung) also describes an image enhancement method that will smooth undesirable features by modifying the shape of the original bitmap pixels. The pixel under scrutiny is the central pixel of a forty-nine pixel window. This broader window allows more accurate modification than a three-by-three window, therefore reduces erroneous correction on graphical artwork and half-tone pictures. However, this increased pixel window requires a much larger storage memory and logic network.

U.S. Pat. No. 5,170,442 (Murai) shows a method for text character scaling that depends upon intermediate gray scaling techniques. Murai's method scales bitmap text characters stored in a permanent memory for subsequent insertion into a higher or lower density bitmap image. Therefore, the method does not encounter and distort objects such as graphical artwork or half-tone pictures. Murai uses a 3×3 pattern extractor to represent the character input in an intermediate two-bit per pixel gray scale representation (see FIG. 3). Characters are reduced or enlarged based upon the gray scale intermediate representation (FIG. 4d) and the new pixel positions (FIG. 5). A memory reference table (23) converts the intermediate gray scale representation back into a binary data output. Murai's method thus requires a complex computation and the use of a large fixed memory for a look-up table.

Therefore, there is a need for a method of converting data on a two-to-one scale that can operate on a composite bitmap image, smoothing objects such as text while minimizing erroneous corrections on graphical artwork or half-tone images.

SUMMARY OF THE INVENTION

In its basic aspect, the present invention provides a method for recognition of logical frequency domain patterns in a dot matrix data set by mapping a subset of data representative of adjacent pixels into a 3×3 window matrix and examining the subset by an exclusive OR function such that if the exclusive OR function provides a logical TRUE condition, designating the subset of data as logical frequency domain pattern data. In an application, the present invention uses a three-square data window to examine and to convert data in a two-to-one ratio. Data is altered from a linear 2×-expansion if and when the 3×3 data meets four criteria that determines the frequency content of the 3×3 data. The criteria are deterministic of whether a random pattern—such as in a graphical artwork figure, digitized photographic image, or the like—or a logical frequency domain pattern—namely text characters, numbers, or the like—are being printed. The smoothing method is employed only after it is determined that a logical frequency domain pattern is to be printed.

It is an advantage of the present invention that it scales data to a 2×-resolution and simultaneously smooth edge effects of character patterns being generated.

It is an advantage of the present invention that it can be effectively applied to data that contains both character text and graphical artwork or half-tone pictures.

It is an advantage of the present invention that it smooth character texts while minimizing erroneous effects on graphical artwork or half-tone pictures.

It is yet another advantage of the present invention that it is flexible and simple to implement and can be implemented in hard copy device hardware, software, or firmware.

It is still another advantage of the present invention that it provides a fast, efficient, low cost method for scaling of the stored character generation data.

It is a further advantage of the present invention that it provides relatively real-time solution to software or firmware implemention methods.

It is a further advantage of the present invention that it can be adapted to utilize dot modulation capability if present.

Other objects, features and advantages of the present invention will become apparent upon consideration of the following detailed description and the accompanying drawings, in which like reference designations represent like features throughout the figures.

DESCRIPTION OF THE DRAWINGS

FIG. 2, including

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

Figure 1:
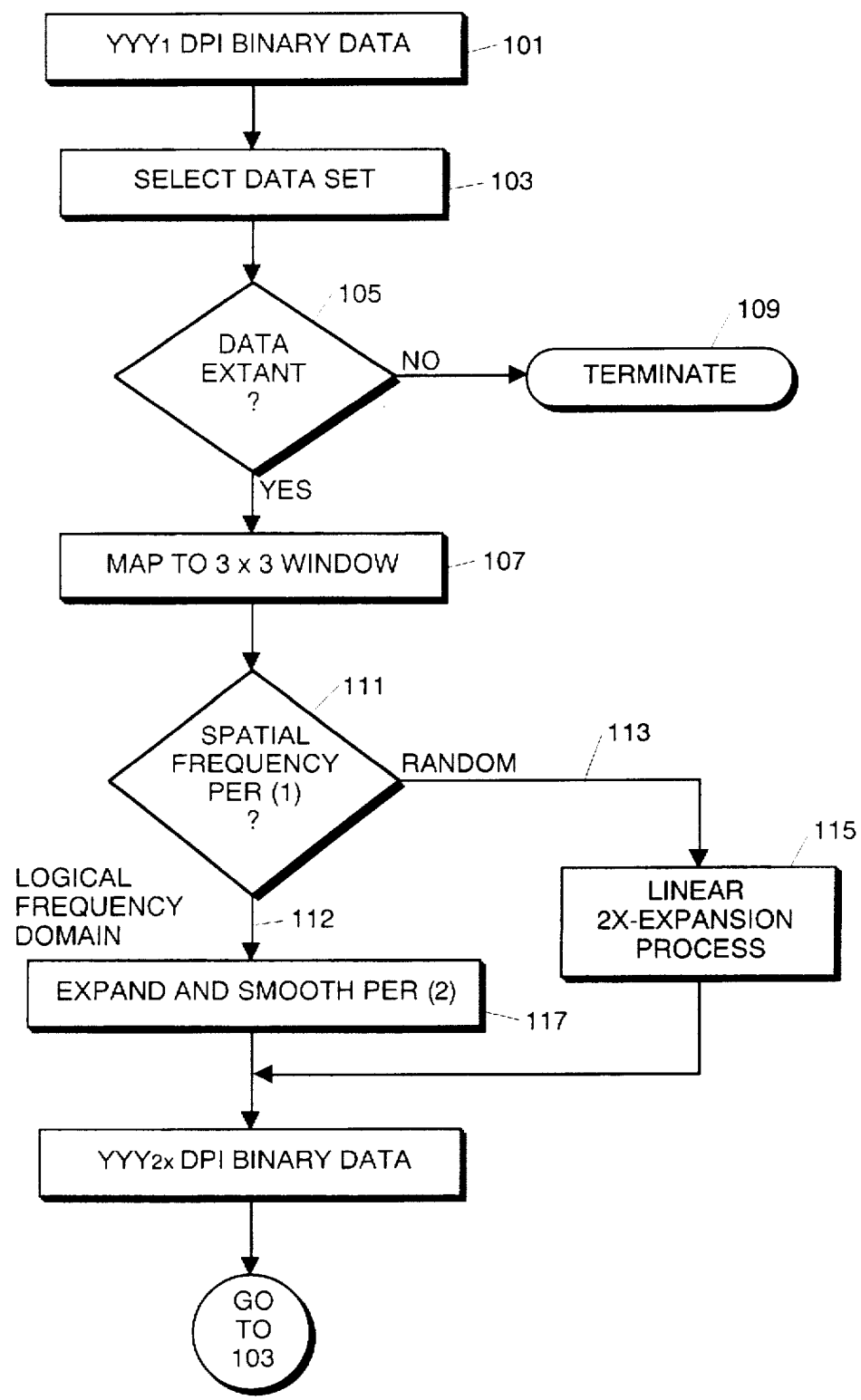
FIG. 1 is a flow chart of the method of the present invention.

The method of the present invention is shown in FIG. 1 in a step-by-step flow chart. The fundamental concept of the present invention is shown in FIG. 2 in terms of an exemplary embodiment.

Figure 2A:
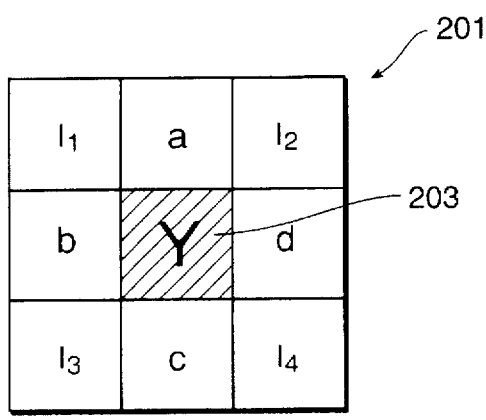
FIGS. 2A and 2B, is a depiction of a 3×3 data window in accordance with the present invention as shown in FIG. 1.
Figure 2B:
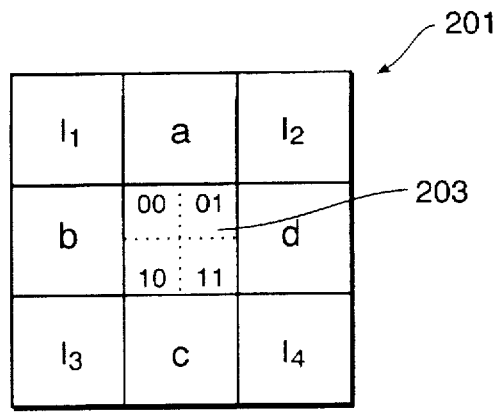

In the example, as shown in FIG. 2A, a 3×3 window 201, representing nine adjacent pixels of a dot matrix pattern, is used to examine and convert data from 300 DPI to 600 DPI, or other density doubling. The process operates on a candidate pixel, represented by the center box 203. A doubling of dot density requires a horizontal and vertical doubling for each pixel (generally, the dots having a diameter greater than or equal to one-quarter of the diameter of the low density printing dot). Therefore, the candidate pixel 203 under scrutiny is mapped quadrantally as blocks 00, 01, 10 and 11 as shown in FIG. 2B.

The process alters the data from a linear 2×-expansion when it finds the following logical expression (1) to be true:

$$(a \oplus c)(b \oplus d). \tag{1}$$

Figure 3:
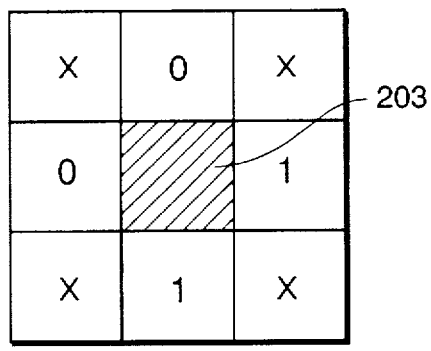
FIG. 3 is a depiction of the 3×3 data window as shown in FIG. 2B demonstrating four configurations for determining implementation strategy.
Figure 3:
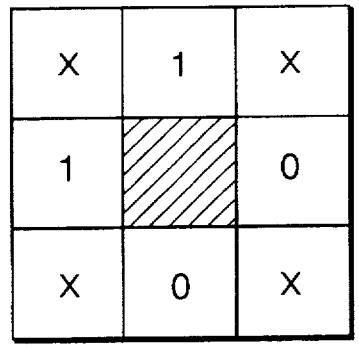
Figure 3:
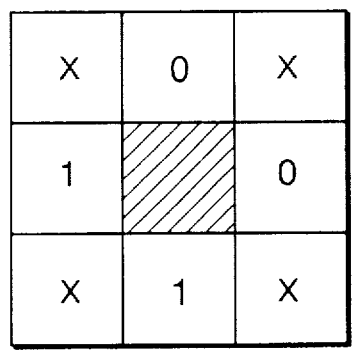
Figure 3:
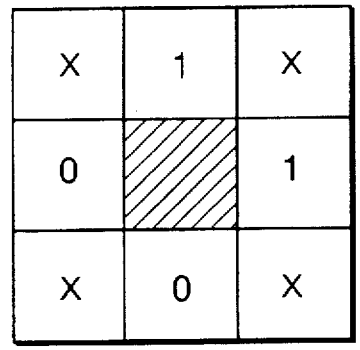

This translates to four possible data conditions as shown in FIG. 3. Note that this part of the methodology disregards the diagonally adjacent pixels to the pixel 203 under scrutiny.

Frequency content of the extracted wind is then examined. Each mapped position 00, 01, 10, 11 is then subjected to an arithmetic expression determinative of whether or not data smoothing is required. That is, a dot is applied to only those mapped positions where the following expressions (2) proves to be true, namely:

$$\text{dot } 00=1, \text{ if } 2b+I_1+2a+4Y>5; \text{ otherwise dot } 00=0;$$
$$\text{dot } 01=1, \text{ if } 2a+I_2+2d+4Y>5; \text{ otherwise dot } 01=0;$$
$$\text{dot } 10=1, \text{ if } 2b+I_3+2c+4Y>5; \text{ otherwise dot } 10=0;$$
$$\text{dot } 11=1, \text{ if } 2d+I_4+2c+4Y>5; \text{ otherwise dot } 11=0; \tag{2}$$

where Y=the pixel under scrutiny and where 1=black (or resultantly, "add dot to expand") and 0=white (or "no added dot").

In other words, if and only if any of the four conditions as shown in FIG. 3 is met in the original data 3×3 window, expression (2) is applied. The mapped positions are then dotted or not in accordance with the results of examination under expressions (2).

The process thus uses the four cases to determine whether or not the pixel 203 under scrutiny needs to be remapped. If none of the four cases is true, a straight forward linear 2×-expansion as known in the prior art is performed. The window can be shifted then to the next 3×3 window. In other words, a next logical window of 3×3 data is extracted, the window shifted by one step to a next group of nine adjacent pixels horizontally or vertically if the end of a row has been reached. The process is then repeated for the next center pixel of the extracted window.

In effect, this process discriminates between the spatial frequency (viz. density) of the data. The underlying assumption is that high spatial frequency data are parts of a half-tone picture or highly detail components of graphical artwork; low spatial frequency is indicative of regularity as would be found in printed alphanumeric text. Spatial resolution by application of the process in the case of text recognition thus leads to the smoothing of the data and, hence, higher print quality in a 2×-expansion enhancement.

Referring back to FIG. 1, it will be recognized by a person skilled in the art that the process of the present invention can be implemented in software, hardware or firmware such as part of an application specific integrated circuit ("ASIC"). Data to be scaled is presented 101 with a first dot density, "YYY$_1$ DPI." It is given that the data is to be scaled to a second dot matrix density equal to twice YYY DPI, "YYY$_{2x}$ DPI" hereinafter.

A 3×3 data set is selected 103. If data is still available (i.e., conversion is not yet completed) 105, the set is then mapped 107 to the 3×3 window as explained hereinabove. If all data has been converted, the routine can be appropriately terminated 109.

The mapped data is then examined 111 for spatial frequency. If the data of the set is found to be random 111, 113, a linear 2×-expansion process 115 is performed; that is, a straight linear scaling conversion of the data in a 2-to-1 ratio of the dot matrix is provided. If a logical frequency domain pattern is detected 111, 112 the expansion and smoothing of the data per expression (2) as set forth hereinabove is performed 117.

A new data set, $YYY_{2x}$ DPI data set is thus produced and the process repeats for the next data set, i.e., the next logical 3×3 window of the data pattern.

Figure 4:
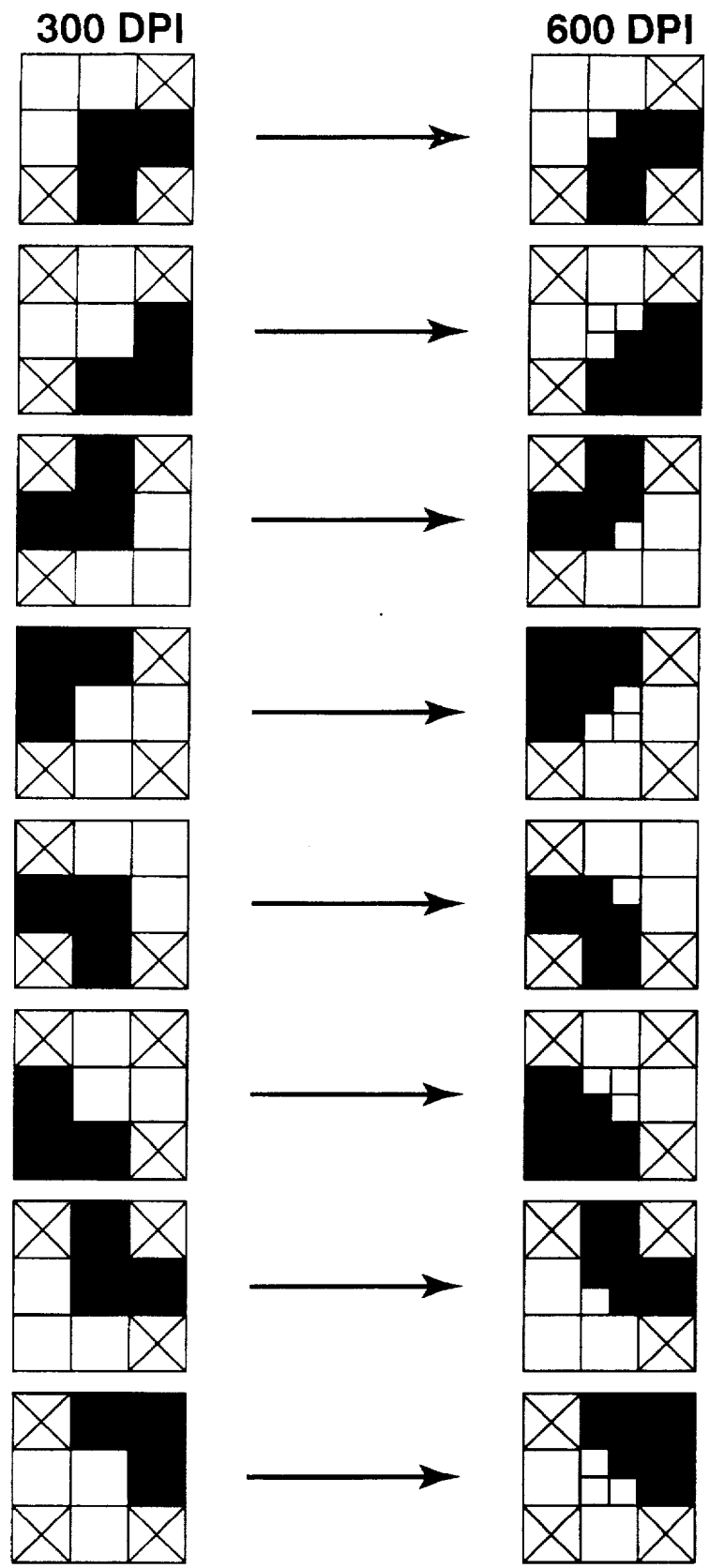
FIG. 4 is a graphical representation of digital data patterns implementing the method of the present invention.

Referring now to FIG. 4, an alternative implementation is shown in which the conversion method is implemented via a look-up table using eight patterns. A person skilled in the art will be able to implement such a look-up table in accordance with well known digital data processing techniques.

Note that the output of an enhanced pattern can be accomplished in real-time. That is, data for an enhanced pixel (or a predetermined set of pixels such as a print swath) can be sent on an output from the logic employed to implement the method (as would be well known in the art of data processing techniques) to a buffer, such as a printer input buffer, as the enhancement method proceeds with successive pattern analysis.

It should also be recognized that the present invention can be used in combination with other data smoothing techniques such as dot modulation. U.S. Pat. Nos. 4,503,444 (Tacklind), 4,680,645 (Dispoto et al.), and 4,982,199 (Dunn), each assigned to the common assignee of the present invention, teach exemplary methods of dot volume modulation and are incorporated herein by reference in their entireties.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A 2×-expansion method for enhanced hard copy dot matrix printing of a pattern represented by correlated digital data, comprising:
   a. selecting a 3×3 matrix of adjacent pixels;
   b. selecting a center pixel as candidate for enhancement;
   c. determining whether said 3×3 matrix is a random pattern or a logical frequency domain pattern by examining the 3×3 matrix top center (designate "a"), left side center (designate "b"), bottom center (designate "c"), and right side center (designate "d") pixel representations in accordance with the following expression:

$(a \oplus c)(b \oplus d)$, where each designate is a predetermined binary representation of whether a relative position is a dotted pixel or a not-dotted pixel; and designating the pattern as random if the expression is FALSE or as a logical frequency pattern if the expression is TRUE; and i. enhancing said data for said center pixel if said 3×3 matrix is a logical frequency domain pattern; or
   ii. performing a linear 2×-expansion for said center pixel if said 3×3 matrix is a random pattern wherein said step of enhancing said data for said center pixel if said 3×3 matrix is a logical frequency domain pattern includes sectioning said candidate center pixel into four quadrants, mapping said candidate center pixel with predetermined designators, mapping said 3×3 matrix corner pixel representations with predetermined designators, and enhancing said data for said candidate center pixel in accordance with the following expression:

dot 00=1, if $2b+I_1+2a+4Y>5$; otherwise dot 00=0;

dot 01=1, if $2a+I_2+2d+4Y>5$; otherwise dot 01=0;

dot 10=1, if $2b+I_3+2c+4Y>5$; otherwise dot 10=0;

dot 11=1, if $2d+I_4+2c+4Y>5$; otherwise dot 11=0;

where
   Y is said candidate center pixel,
   $I_1$ is the upper left corner of the matrix, adjacent a, b and center,
   $I_2$ is the upper right corner of the matrix, adjacent a, d and center,
   $I_3$ is the lower left corner of the matrix, adjacent b, c and center,
   $I_4$ is the lower right corner of the matrix, adjacent c, d and center,
   00 is the upper left quadrant of the center, adjacent a, $I_1$ and b,
   01 is the upper right quadrant of the center, adjacent a, $I_2$ and d,
   10 is the lower left quadrant of the center, adjacent b, $I_3$ and c,
   11 is the lower right quadrant of the center, adjacent c, $I_4$ and d,
   1=black (or resultantly, "add dot to expand"), and
   0=white (or resultantly, "no added dot").

2. The method as set forth in claim 1, further comprising:
   employing said method in combination with a dot volume modulation process.

3. A process for expansion scaling a dot matrix pattern of digital data by a factor of two comprising:
   a. receiving digital data representative of a predetermined dot matrix pattern for scaling;
   b. selecting a subset of data from said pattern comprising a first 3×3 matrix of said data representative of a block of nine pixels of said dot matrix pattern;
   c. determining the spatial frequency of the selected first 3×3 matrix of said data; and
      i. if the determined spatial frequency of the selected first 3×3 matrix of said data is indicative of a random dot matrix pattern, performing a linear 2×-expansion of each said nine pixels; or
      ii. if the determined spatial frequency of the selected first 3×3 matrix of said data is indicative of a logical frequency domain dot matrix pattern,
         (1) dividing the center pixel of said block of nine pixels into four quadrants;
         (2) adding a data bit indicative of dotting each mapped quadrantal sub-pixel of said center pixel only when all its adjacent matrix pixels are all dotted, including mapping said candidate center pixel with predetermined designators; mapping said 3×3 matrix corner pixel representations with predetermined designators; and enhancing said data for said center pixel in accordance with the following expression:

dot 00=1, if $2b+I_1+2a+4Y>5$; otherwise dot 00=0;

dot 01=1, if $2a+I_2+2d+4Y>5$; otherwise dot 01=0;

dot 10=1, if $2b+I_3+2c+4Y>5$; otherwise dot 10=0;

dot 11=1, if $2d+I_4+2c+4Y>5$; otherwise dot 11=0;

where
Y is the center pixel;
$I_1$ is the upper left corner of the matrix, adjacent a, b and center;
$I_2$ is the upper right corner of the matrix, adjacent a, d and center;
$I_3$ is the lower left corner of the matrix, adjacent b, c and center;
$I_4$ is the lower right corner of the matrix, adjacent c, d and center;
00 is the upper left quadrant of the center, adjacent a, $I_1$ and b;
01 is the upper right quadrant of the center, adjacent a, $I_2$ and d;
10 is the lower left quadrant of the center, adjacent b, $I_3$ and c;
11 is the lower right quadrant of the center, adjacent c, $I_4$ and d;
1=black (or resultantly, "add dot to expand"); and
0=white (or resultantly, "no added dot");

d. repeating steps b. through c. for each pixel of said dot matrix pattern until all data of said dot matrix pattern has been scaled.

4. The process as set forth in claim 3, wherein said step of determining the spatial frequency of the selected first 3×3 matrix of said data is indicative of a random dot matrix pattern of a logical frequency domain dot matrix pattern comprises:

examining the 3×3 matrix top center (designate "a"), left side center (designate "b"), bottom center (designate "c"), and right side center (designate "d") pixel representations in accordance with the following expression:

$$(a \oplus c)(b \oplus d),$$

where each designate is a predetermined binary representation of where it relative position is a dotted pixel, a "1" or a not-dotted pixel, a "0"; and designating the pattern as random if the expression is FALSE or as a logical frequency pattern if the expression is TRUE.

5. A quadrantal scaling of dot matrix data method for a scaling a dot matrix data pattern to a 2×-resolution enhanced dot matrix data pattern, said method comprising:

a. selecting a subset of data from said dot matrix data pattern including a pixel to be scaled and each adjoining pixel wherein said subset forms a 3×3 data matrix with said pixel to be scaled is central to said 3×3 data matrix;

b. determining the spatial print density of said 3×3 data matrix with respect to pixels horizontally and vertically adjoining said pixel to be scaled in accordance with the expression:

$$(a \oplus c)(b \oplus d),$$

where
"a" and "c" designate vertically opposing adjoining pixels to said pixel to be scaled, and
"b" and "d" designate horizontally opposing adjoining pixels to said pixel to be scaled;

c. performing a linear 2×-expansion of said pixel to be scaled if said expression is not TRUE; or d. converting said pixel to be scaled to an enhanced pixel if said expression is TRUE by
      i. mapping said pixel to be scaled with predetermined designators;
      ii. mapping said 3×3 matrix corner pixel representations with predetermined designators; and
      iii. enhancing said data for said pixel to be scaled in accordance with the following expression:

dot 00=1, if $2b+I_1+2a+4Y>5$; otherwise dot 00=0;

dot 01=1, if $2a+I_2+2d+4Y>5$; otherwise dot 01=0;

dot 10=1, if $2b+I_3+2c+4Y>5$; otherwise dot 10=0;

dot 11=1, if $2d+I_4+2c+4Y>5$; otherwise dot 11=0;

where
Y is the pixel to be scaled;
$I_1$ is the upper left corner of the matrix, adjacent a, b and center;
$I_2$ is the upper right corner of the matrix, adjacent a, d and center;
$I_3$ is the lower left corner of the matrix, adjacent b, c and center;
$I_4$ is the lower right corner of the matrix, adjacent c, d and center;
00 is the upper left quadrant of the center, adjacent a, $I_1$ and b;
01 is the upper right quadrant of the center, adjacent a, $I_2$ and d;
10 is the lower left quadrant of the center, adjacent b, $I_3$ and c;
11 is the lower right quadrant of the center, adjacent c, $I_4$ and d;
1=black (or resultantly, "add dot to expand"); and
0=white (or resultantly, "no added dot").

6. A hard copy apparatus, having a device for providing 2×-expansion of a hard copy dot matrix pattern represented by digital data and printing enhanced data comprising:

means for storing a 3×3 matrix of adjacent pixels;

logic means for determining whether said 3×3 matrix is a random pattern or a logical frequency domain pattern and enhancing said data for said center pixel if said 3×3 matrix is a logical frequency domain pattern or performing a linear 2×-expansion for said center pixel if said 3×3 matrix is a random pattern and including means for storing enhanced data for said candidate center pixel in accordance with the following expression:

dot 00=1, if $2b+I_1+2a+4Y>5$; otherwise dot 00=0;

dot 01=1, if $2a+I_2+2d+4Y>5$; otherwise dot 01=0;

dot 10=1, if $2b+I_3+2c+4Y>5$; otherwise dot 10=0;

dot 11=1, if $2d+I_4+2c+4Y>5$; otherwise dot 11=0;

where

Y is said candidate center pixel;

$I_1$ is the upper left corner of the matrix, adjacent a, b and center;

$I_2$ is the upper right corner of the matrix, adjacent a, d and center;

$I_3$ is the lower left corner of the matrix, adjacent b, c and center;

$I_4$ is the lower right corner of the matrix, adjacent c, d and center;

00 is the upper left quadrant of the center, adjacent a, $I_1$ and b;

01 is the upper right quadrant of the center, adjacent a, $I_2$ and d;

10 is the lower left quadrant of the center, adjacent b, $I_3$ and c;

11 is the lower right quadrant of the center, adjacent c, $I_4$ and d;

1=black (or resultantly, "add dot to expand"); and

0=white (or resultantly, "no added dot"); and means for printing enhanced data.

7. The device as set forth in claim 6, wherein said logic means further comprises:

exclusive OR function means for comparing the 3×3 matrix top center (designate "a"), left side center (designate "b"), bottom center (designate "c"), and right side center (designate "d") pixel representations in accordance with the following expression:

$$(a \oplus c)(b \oplus d),$$

where each designate is a predetermined binary representation of whether a relative position is a dotted pixel or a not-dotted pixel and for designating the pattern as random if the expression is FALSE or as a logical frequency pattern if the expression is TRUE.

8. The device as set forth in claim 7, wherein said means for printing enhanced data further comprises:

means for modulating dot volume on said hard copy.

9. In a bitmap graphics computing apparatus, a method for 2×-expansion of a digital data pattern, comprising:

a. selecting a 3×3 matrix of adjacent pixels;

b. selecting a center pixel as candidate for enhancement;

c. determining whether said 3×3 matrix is a random pattern or a logical frequency domain pattern, including examining the 3×3 matrix top center (designate "a"), left side center (designate "b"), bottom center (designate "c"), and right side center (designate "d") pixel representations in accordance with the following expression:

$$(a \oplus c)(b \oplus d),$$

where each designate is a predetermined binary representation of whether a relative position is a dotted pixel or a not-dotted pixel; and designating the pattern as random if the expression is FALSE or as a logical frequency pattern if the expression is TRUE; and i. enhancing said data for said center pixel if said 3×3 matrix is a logical frequency domain pattern by
   (1) sectioning said candidate center pixel into four quadrants,
   (2) mapping said candidate center pixel with predetermined designators,
   (3) mapping said 3×3 matrix corner pixel representations with predetermined designators, and
   (4) enhancing said data for said candidate center pixel in accordance with the following expression:

$$\text{dot } 00=1, \text{ if } 2b+I_1+2a+4Y>5; \text{ otherwise dot } 00=0;$$

$$\text{dot } 01=1, \text{ if } 2a+I_2+2d+4Y>5; \text{ otherwise dot } 01=0;$$

$$\text{dot } 10=1, \text{ if } 2b+I_3+2c+4Y>5; \text{ otherwise dot } 10=0;$$

$$\text{dot } 11=1, \text{ if } 2d+I_4+2c+4Y>5; \text{ otherwise dot } 11=0;$$

where

Y is said candidate center pixel;

$I_1$ is the upper left corner of the matrix, adjacent a, b and center;

$I_2$ is the upper right corner of the matrix, adjacent a, d and center;

$I_3$ is the lower left corner of the matrix, adjacent b, c and center;

$I_4$ is the lower right corner of the matrix, adjacent c, d and center;

00 is the upper left quadrant of the center, adjacent a, $I_1$ and b;

01 is the upper right quadrant of the center, adjacent a, $I_2$ and d;

10 is the lower left quadrant of the center, adjacent b, $I_3$ and c;

11 is the lower right quadrant of the center, adjacent c, $I_4$ and d;

1=black (or resultantly, "add dot to expand"); and

0=white (or resultantly, "no added dot"); or ii. performing a linear 2×-expansion for said center pixel if said 3×3 matrix is a random pattern.

* * * * *